United States Patent
Chytil

[15] 3,636,325
[45] Jan. 18, 1972

[54] ANALOG-PROGRAMMED CONTROL SYSTEM FOR EXCAVATORS HAVING JIBS

[72] Inventor: Josef Chytil, Hlusovice, Czechoslovakia

[73] Assignee: Unicovske strojirny, narodni podnik, Unicov, Czechoslovakia

[22] Filed: Sept. 16, 1968

[21] Appl. No.: 761,393

[30] Foreign Application Priority Data

Sept. 14, 1967 Czechoslovakia .....................6552/67

[52] U.S. Cl. .............................................235/151, 37/116
[51] Int. Cl. ........................................................G06g 7/48
[58] Field of Search ...................235/151.11, 151, 186, 189, 235/150.26, 150.27, 212/124; 214/135; 37/189, 116

[56] References Cited

UNITED STATES PATENTS

| | | | |
|---|---|---|---|
| 3,079,080 | 2/1963 | Mason | 235/186 X |
| 3,144,146 | 8/1964 | Strickland, Jr. | 214/135 |
| 3,244,243 | 4/1966 | Fielder | 235/150.2 UX |
| 3,460,278 | 8/1969 | Pesauento et al. | 37/116 |
| 3,489,293 | 1/1970 | Sallow | 212/39 X |
| 3,489,294 | 1/1970 | Greb et al. | 212/39 |

*Primary Examiner*—Joseph F. Ruggiero
*Attorney*—Richard Low

[57] ABSTRACT

An analog control system automatically controls the operation of an excavator having a jib and a wheel mounted on the jib and determines the position of the axis of the wheel in a system of coordinates derived from the motion of the excavator. A first sensor senses a coordinate $x$ representing the normal distance from the axis of the wheel to the pivot axis of the excavator. A second sensor senses coordinate $z$ representing the normal distance from the axis of the wheel to the plane of travel of the excavator. A third sensor senses an angle $\epsilon$ representing the angular displacement of the projection of the normal distance from the axis of the wheel to the pivot axis to the plane of travel and the pivot motion of the excavator. A fourth sensor senses an angle $\delta$ representing the angular displacement of the plane of travel from the horizontal plane in the direction of the angular displacement $\epsilon$. A control circuit is electrically connected between each of the first, second, third and fourth sensors and each of the displacement drive, the lift drive and the pivot motion drive of the excavator. Each of the drives is mechanically coupled to a corresponding one of the sensors.

5 Claims, 4 Drawing Figures

ANALOG-PROGRAMMED CONTROL SYSTEM FOR EXCAVATORS HAVING JIBS

DESCRIPTION OF THE INVENTION

The present invention relates to an analog control system for excavators having jibs. More particularly, the invention relates to an analog control system for wheel excavators.

Wheel excavators have been controlled by mechanical or electrical control systems prior to the present invention. In a mechanical control system, a mechanical model similar to the excavator is utilized to operate in the same manner as the actual excavator. The different parameters required for the operation of the excavator are followed by the model and the desired condition and position are imposed on the model and are observed. The mechanical control system has the disadvantages of imperfect pickup or sensing of the program, the imperfection being greater than 2 percent in most cases, of only limited execution of the program, such as, for example, determining only the plane of excavation, and of difficulty in modifying initial conditions, such as, for example, the distance of the excavator from the front wall in actuality and the distance of the model from the front wall. Other disadvantages of the mechanical control system are its considerable weight, the complexity of its production, the difficulties in combining the individual operations, solutions or components to provide a single operation, solution or system, and the impossibility of operating in an automatic cycle.

In an electrical control system, the mathematical relation between a specific parameter and the position of the wheel excavator, such as, for example, for limiting the turning motion, must be determined. The relationship is determined electrically. Even simple movements require complex equations which, although they are electrically soluble, require complex equipment for application. The control provided by the electrical control system is generally inaccurate, because the electrical solution is considerably simplified by the incorporation of less accurate systems. Other disadvantages of the electrical control system result from the impossibility of enacting the entire program, variations of the initial conditions and the considerable difficulties in combining the individual operations, solutions or components to provide a single operation, solution or system.

The analog control system of the present invention overcomes the disadvantages of the known control systems for excavators fitted with jibs.

The principal object of the present invention is to provide a new and improved control system for an excavator fitted with a jib.

An object of the invention is to provide an analog control system for controlling an excavator having a jib with an accuracy of 99.5 to 99.9 percent.

An object of the invention is to provide an analog control system for an excavator having a jib, which system may be readily varied in operating parameters.

An object of the invention is to provide an analog control system for an excavator having a jib, which system operates independently of initial conditions.

An object of the invention is to provide an analog control system for an excavator having a jib, which system operates in an automatic cycle.

An object of the present invention is to provide an analog control system for an excavator having a jib, which system enacts the entire program and completely solves a problem.

An object of the present invention is to provide an analog control system for an excavator having a jib, which system may be readily utilized to control excavators already built.

An object of the present invention is to provide an analog control system for an excavator having a jib, which system may be produced with simplicity, facility and rapidity.

An object of the present invention is to provide an analog control system for an excavator having a jib, which system operates with efficiency, effectiveness, accuracy and reliability.

In accordance with the present invention, an analog control system comprises a first sensor for sensing the coordinates $x$ which represent the normal distance from the axis of the wheel of an excavator to the pivot axis of the excavator. The output of the first sensor is connected to the input of a servomultiplier and, via a first adder, to a first compensating amplifier. A second sensor senses the coordinates $z$ which represent the normal distance from the axis of the wheel of the excavator to the plane of travel of the excavator. The output of the second sensor is connected to a second compensating amplifier via a third adder. A jib control controls the displacement of the jib of the excavator, which jib supports the wheel thereof, and the lift of the jib. The outputs of the first and second compensating amplifiers are connected to the inputs of the first and second sensors via gates and the jib control. A third sensor senses the angle, $\epsilon$ which represent the angular displacement of the projection of the distance $x$ to the plane of travel of the excavator and the pivot motion of the excavator. A fourth sensor senses the deflection $\delta$ which represents the angular displacement of the plane of travel of the excavator from the horizontal plane in the direction of the coordinate $\epsilon$. The third sensor has two outputs connected to corresponding inputs of the servomultiplier and the fourth sensor has an output connected to a corresponding input of the servomultiplier. A first output of the servomultiplier is connected to a fixed adder and via a fixed potentiometer to an eighth adder. The second output of the servomultiplier is connected to the eighth adder via a seventh potentiometer. The third output of the servomultiplier is connected to the third adder via a gate and the seventh adder. The eight adder is connected to the seventh adder through a gate. The second compensating amplifier is connected to the third adder through the gate, the second potentiometer and the fourth adder. The fifth potentiometer is connected to the fourth adder via a gate. The fourth adder is connected to the eighth potentiometer, to the output of which is connected the sixth adder and the second adder. The second adder is also connected to the first adder. To the second adder there is also connected the fourth potentiometer through a gate and the first compensating amplifier through another gate and the first potentiometer. The first potentiometer is connected to the fifth adder via a gate. The sixth adder is connected to the fifth adder onto which there is directly connected the third compensating amplifier and the third potentiometer via a gate. The third compensating amplifier is connected to the pivot drive, which is connected to the third sensor. The second compensating amplifier is connected to the lift drive which is connected to the first and second sensor. The first compensating amplifier is connected to the travel drive, which is connected to the first and second sensor.

In order that the present invention may be readily carried into effect, it will now be described with reference to the accompanying drawings, wherein:

FIGS. 1a and 1b, being a continuation of each other, shown in schematic diagram the functional arrangement of an excavator having a jib on which is mounted a wheel and illustrating the coordinating sensing units and the method of sensing said coordinates showing the maintenance of the horizontal plane and of any desired plane and further illustrating a block diagram of the analog control system of the present invention.

Figure 1A:
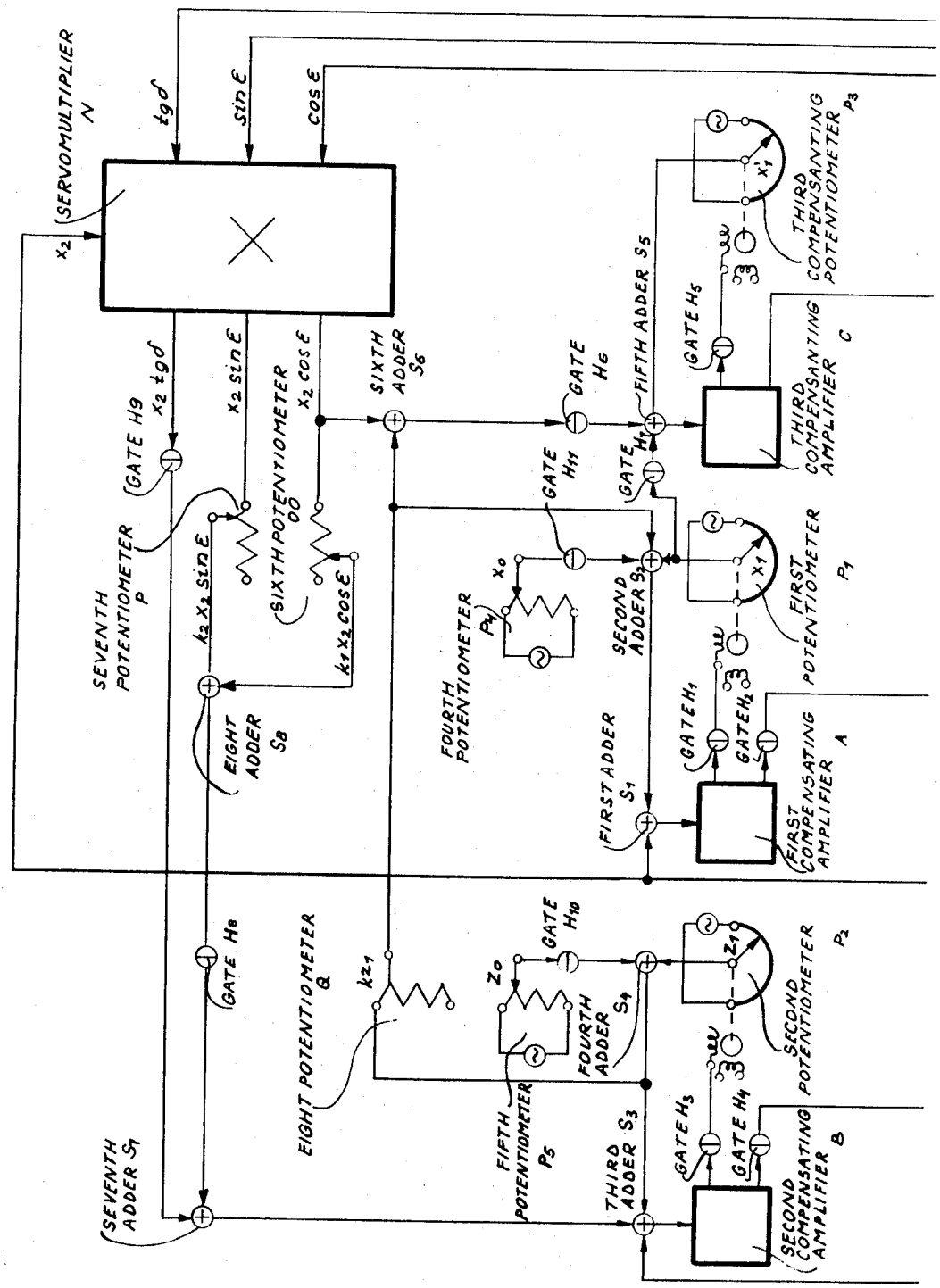

The analog control system of the present invention controls the operation of an excavator fitted with a jib which supports a wheel. The analog control system comprises the operating machinery of the excavator, the programmed control apparatus which connects into circuit and operates the computer circuits of the analog computer and determines the sequence of operations, and the analog computer which processes the operations provided by the adjusted program.

The operating machinery of the excavator controls the operation of the main drives, which include the lift drive E (FIG. 1) for controlling the lift of the jib, the displacement drive (FIG. 1) for controlling the displacement of the jib, and the pivot motion drive V (FIG. 1) for controlling the pivot motion of the excavator. The wheel mounted on the jib of the excavator has an axis D (FIG. 1), which is positioned in accordance with the output of the control system. The position D of the axis of the wheel is determined by the coordinates $x$, $z$ and $\epsilon$.

The coordinate $x$ represents the normal distance from the axis of the wheel to the pivot axis or axis of revolution O of the excavator The coordinate $z$ represents the normal distance from the axis of the wheel to the plane of travel PT of the excavator. The coordinate $\epsilon$ represents the angular displacement of the projection of the distance $x$ to the plane of travel PT of the excavator and the pivot motion of the excavator.

In order to facilitate the operation of the analog control system, the coordinates $x$ and $z$ are expressed as voltages $x_1$ and $x_2$ and $z_1$ and $z_2$ and the coordinate $\epsilon$ is considered to represent the actual pivotal angle of the excavator.

As shown in FIG. 1, the electrical expressions of the coordinates are based on the length L of the jib JJ and the input voltage of a Selsyn analyzer positioned at a point J which is the pivotal axis of said job. The point J is the axis of the pivotal base connection of the jib JJ on the feeding crab. The rotor of the Selsyn analyzer is angularly displaced by an angle $\alpha$, which is the angle between the jib JJ and a line LP parallel to the plane of travel PT of the excavator and passing through the axis J.

The input voltage of the Selsyn analyzer is proportional to the constant length L of the jib, so that the ratio between said voltage and said length defines the scale of operations. The output voltage of the Selsyn analyzer at one of its outputs is L sin $\alpha$ and at the other of its outputs is L cos $\alpha$, which express the projection of the jib length L on the $z$ and $x$ coordinate directions, respectively.

The point J, which is the pivotal axis of the jib JJ is displaced between end or limit positions I and G by the displacement crab. The displacement of the point J is indicated by a double potentiometer in a manner whereby the voltage on each potentiometer is so selected that the input voltage on the selected scale is proportional to the projection of a length $h$ on the $x$ and $z$ coordinate directions. The length $h$ represents the distance between the pivotal axis J and the end or limit position G. Another voltage is determined by the distance $d$ of the limit position G above the plane of travel PT of the excavator. The coordinates $x_1$ and $z_1$ and $x_2$ and $z_2$ are electrically expressed by the sum of the individual voltages.

A first sensor U sensors the coordinate $x$. The output of the first sensor U is connected to the input of a servomultiplier N and to the input of a first compensating amplifier A, via a first adder $S_1$. A second sensor T senses the coordinates $z$. The output of the second sensor T is connected to the input of a second compensating amplifier B via a third adder $S_3$. The output of the first compensating amplifier A is connected to the displacement drive F via a second gate $H_2$ and the output of the second compensating amplifier B is connected to the lift device E via a fourth gate $H_4$.

The displacement drive F is mechanically coupled to the second sensor T. The displacement drive F is mechanically coupled to the first sensor and the second sensor T and the lift drive E is mechanically coupled to the first sensor and the second sensor T. A third M sensors the coordinates. A fourth sensor R sensors the deflections. One output of the third sensor M is connected to a first input of the servomultiplier N and a second output of said third sensor is connected to a second input of said servomultiplier. The output of the fourth sensor R is connected to a third input of the servomultiplier N.

The fourth sensor R, as well as the third sensor M, is angularly displaced by an angle $\epsilon$. The third sensor M may comprise, for example, a Selsyn analyzer. The fourth sensor R may comprise, for example, a Selsyn device having a weight eccentrically mounted on its shaft and immersed in an oil bath which functions as a damper. The angular displacement of the rotor of the fourth sensor R is determined by the deflection of the travel plane PT of the excavator from the horizontal in the direction of angular displacement of said fourth sensor.

The servomultiplier N functions to process data about the position of the excavator. A first output of the servomultiplier N is connected to an eighth adder $S_8$ via a sixth potentiometer OO and is directly connected to a sixth adder $S_6$. A second output of the servomultiplier N is connected to the eighth adder $S_8$ via a seventh potentiometer P. The eighth adder $S_8$ is connected to a seventh adder $S_7$ via an eighth gate $H_8$. A third output of the servomultiplier N is connected to the seventh adder $S_7$ via a ninth gate $H_9$. The seventh adder $S_7$ is directly connected to the third adder $S_3$.

The third adder $S_3$ is connected directly to the second compensating amplifier B and is also connected to said second compensating amplifier via a fourth adder $S_4$, a second potentiometer $P_2$ and a third gate $H_3$. The fourth adder $S_4$ is connected to a fifth potentiometer $P_5$ via a tenth gate $H_{10}$. The fourth adder $S_4$ is also directly connected to an eighth potentiometer Q. The output of the eighth potentiometer Q is directly connected to the sixth adder $S_6$ and to a second adder $S_2$ which is directly connected to the first adder $S_1$. The second adder $S_2$ is connected to a fourth potentiometer $P_4$ via an eleventh gate $H_{11}$. The first compensating amplifier A is connected to the second adder $S_2$ via a first gate $H_1$ and a first potentiometer $P_1$.

The first potentiometer $P_1$ is connected to a fifth adder $S_5$ via a seventh gate $H_7$. The sixth adder $S_6$ is connected to the fifth adder $S_5$ via a sixth gate $H_6$. The fifth adder $S_5$ is directly connected to a third compensating amplifier C and is connected to said third compensating amplifier via a fifth gate $H_5$ and a third potentiometer $P_3$. The third compensating amplifier C is directly connected to the pivot motion drive V. The pivot motion drive V is mechanically coupled to the third sensor M.

The Selsyn analyzer of the third sensor M senses the angle $\epsilon$ which represents the pivot motion of the excavator. The output voltage of the third sensor M is thus sin $\epsilon$, cos $\epsilon$ and is therefore proportional to the angle $\epsilon$. The output voltage of the fourth sensor R is proportional to tan $\delta$ when the angle $\delta$ has small magnitudes. These data, which are related to the positions of the excavator, are treated in the servomultiplier N in a manner whereby the voltages cos $\epsilon$, sin $\epsilon$ and tan $\delta$ are multiplied by the voltage $x_2$.

The product $x_2$ cos $\epsilon$ is transferred to the sixth potentiometer OO and the product $x_2$ sin $\epsilon$ is transferred to the seventh potentiometer P. The sixth potentiometer OO multiplies $x_2$ cos $\epsilon$ by a constant $k_1$ and the seventh potentiometer P multiplies $x_2$ sin $\epsilon$ by a constant $k_2$. The constants $k_1$ and $k_2$ are determined by the mechanical adjustment of the potentiometers OO and $P_1$ respectively. The constants $K_1$ and $K_2$ represent manually selectable magnitudes corresponding to the deflections of any plane passing through the roots of the coordinates (FIG. 1b). These deflections are determined by angles $\delta_1$ and $\delta_2$ and constants $K_1$ and $K_2$ represent the tangents of these angles respectively, i.e., $$K_1 = \delta \operatorname{Tan}_1$$

$$K_2 = \delta \operatorname{Tan}_2$$

The angle $\delta_1$ then represents the slope of any plane in the direction of travel of the excavator and angle $\delta_2$ represents the slope of any plane normal to the direction of the travel of the excavator.

The first, second and third potentiometers $P_1$, $P_2$ and $P_3$, respectively, are controlled by the corresponding first, second and third compensating amplifiers A, B, and C, respectively, or maintain the previously adjusted magnitude. The auxiliary voltages $x_1$, $z_1$ and $x'_1$ are provided by the first, second and third potentiometers $P_1$, $P_2$ and $P_3$, respectively, in accordance with the condition of the corresponding first, third and fifth gates $H_1$, $H_3$ and $H_5$, respectively.

An auxiliary voltage $x_o$ indicates the thickness of the vertical earth chip or layer and an auxiliary voltage $z_o$ indicates the thickness of the horizontal earth chip or layer. The voltage $x_o$ is provided by the fourth potentiometer $P_4$. The voltage $z_o$ is provided by the fifth potentiometer $P_5$. Each of the fourth and fifth potentiometers $P_4$ and $P_5$ is manually controlled. The eighth potentiometer Q multiplies the voltage $z_1$ supplied to it by a constant $k$, which is manually controlled and corresponds to the inclination of the entire slope of the earth.

The first to eighth adders $S_1$ to $S_8$ add up the aforedescribed voltages in accordance with the condition of the sixth and eleventh gates $H_6$ and $H_{11}$. The output voltage of the first adder $S_1$ is transferred to the first compensating amplifier. The first compensating amplifier is provided with two outputs connected to gate $H_1$ and $H_2$ respectively. With the gate $H_2$ closed the amplifier can, via gate $H_1$ and the potentiometer $P_1$ (rotated by means of the motor seen in FIG. 1) change the voltage $X_1$ such that the output voltage of the first adder $S_1$ is of zero value. On the other hand, the auxiliary voltage $X_1$ may be maintained unchanged (with the gate $S_1$ closed) so that the amplifier A can control, through the gate $H_2$, the drive for the travel of the excavator by which the coordinates and also the resultant voltage $X_2$ is changed such that the output voltage of the first adder is of zero value. In similar manner, the second and third compensating amplifiers B and C can be operated so that either the auxiliary voltages $Z_1$ and $X'_1$ of the second and third potentiometers $P_2$ and $P_3$ are changed or the position of the jib of the excavator (i.e., the coordinate Z and the angle $\epsilon$) are changed.

The analog system of the present invention controls the operations of the excavator if it is provided with data which indicates the frontal slope of the earth, the lateral slope of the earth, the horizontal plane, the required plane and the chip or layer of earth provided by the supply or lifting motion. The programmed control, which comprises a plurality of recorded programs, controls the switching and control functions of the analog control system including the sequence of operations.

The analog for programmed control system equipment may contain fixed programs which control the sequence of operations. Each individual operation is determined by selection of the suitable switch means providing the adjustment of gates $H_1$ through $H_{11}$. Each individual program consists of a line of relays which mutually switch after the end of each operation and which are connected in such a manner that the individual operations in selected programs work automatically. Those relays which control the switches of the individual operations by means of the gates $H_1$ through $H_{11}$ are adjustable operations as mentioned above. The selection of the suitable program is manually made by activating the particular relays corresponding with the required program.

The input signals $x_2$ and $z_2$ of the analog control system are treated in a manner whereby if the excavator is manually controlled the first, third, fifth and seventh gates $H_1$, $H_3$, $H_5$ and $H_7$ are in their conductive condition and the first, second and third compensating amplifiers A, B and C solve the following equations.

$$A_3 ..... kz_1 + x_1 - x_2 = 0$$

$$B_1 ..... z_1 - z_2 = 0$$

$$C_1 ..... x'_1 - x_1 = 0$$

The system is applicable when the angle of the frontal slope and the angle of the lateral slope are equal. Aside from the auxiliary coordinates $x_1$ and $z_1$, the system also provides the auxiliary coordinates $x_0$ and $z_0$, which are proportional to the size of the chip, as hereinbefore described. The magnitude of the auxiliary coordinates $x_0$ and $z_0$ may be adjusted or varied as the magnitude of the constant $k$ in the product $kz_1$ according to the required slope. The coordinate $\delta$ is then provided by the system as the actual angular displacement of the excavator.

The magnitudes $\sin \epsilon$ and $\cos \epsilon$ are utilized in the control system, and the fourth sensor R, which, as hereinbefore described, senses the angle $\delta$, is turned at the angle $\epsilon$. Thus, the sensing of the angle $\epsilon$ and the computation of $\tan \delta$ are accomplished by a Selsyn, the shaft of which has a weight eccentrically mounted thereon and immersed in an oil bath for damping, as hereinbefore described. The output voltage of the Selsyn is proportional to the sine of the angle of displacement of the shaft thereof.

When the excavator is at small angles of inclination, as occurring in practice, $$\tan \delta \doteq \sin \delta$$

wherein $\delta$ is the angle of deflection of the plane of travel PT of the excavator from the horizontal plane HH through the axis D of the wheel of the excavator and the axis of revolution O of the excavator.

The Selsyn is angularly displaced in such a manner that the motion of the eccentrically positioned weight on the Selsyn shaft is only at the angle $\epsilon$. The magnitudes $\sin \alpha$, $\cos \epsilon$ and $\tan \delta$ are multiplied by the coordinate $x_2$ and the magnitudes $x_2 \cos \epsilon$ and $x_2 \sin \epsilon$ are multiplied by the constants $k_1$ and $k_2$, which represent the line gradient of the frontal slope or inclination $\delta_1$ and the lateral slope or inclination $\delta_2$, as shown in FIG. 6, of any plane, and are prepared for further treatment.

The individual data in the analog control system are indicated without polarity. The sums resulting from the additions are provided in series, and the appropriate polarity is selected by utilizing the sums in such a manner as to apply the equations at the individual compensating amplifiers. One equation is always valid at each compensating amplifier in accordance with the selected computing components. In order to maintain the frontal slope when the chip or layer is provided as a result of the lift motion, the programmed control determines the computing components and the sequence of operations in such a manner that the excavator is manually adjusted in its initial position at the commencement of excavation by the pivot motion of said excavator.

Upon the termination of the pivot motion, the wheel of the excavator is lowered by one chip, the second, fourth, fifth, seventh and tenth gates $H_2$, $H_4$, $H_5$, $H_7$ and $H_{10}$ are switched to their conductive condition and the first, second and third compensating amplifiers A, B and C solves the following equations. During programmed control the manually selected coordinates $X_1$ and $Z_1$ do not change even though the actual position of the wheel (i.e., coordinates $Z_2$ and $X_2$) does change. The gates $H_1$ and $H_3$ are initially normally closed while the gates $H_2$ and $H_4$ are open. When the wheel is moved by a chip, a swing motion excavation and new adjustment of the analog computer follow. The initially opened gates are closed and the gate $H_1$, $H_3$, $H_5$ and $H_7$ are opened. The computing network is adjusted and the same equations are valid with programmed controls as with manual handling. Maintenance of the plane parallel to the plane of travel, when the chip is made by extending the jib is accomplished by the computing network which sets the succession of operations by which the program controls the wheel as if it had been manually adjusted in its initial position and the excavation has been finished, the extension by the chip follows and the gates $H_2$ and $H_4$ and $H_5$ and $H_{11}$ are opened and the compensating amplifiers A, B and C operate so that the following equations are valid.

$$A_2 ..... kz_1 + x_1 + x_0 - x_2 = 0$$

$$B_1 ..... z_1 - z_2 = 0$$

$$C_1 ..... x'_1 - x_1 = 0$$

Although the actual position of the wheel of the excavator varies, the coordinates $x_1$ and $z_1$ do not vary. The motion of the excavator is followed by further excavating operations and a new adjustment, as in the case of manual control. A new component $x_1$ is adjusted by the switching of the first, fifth and seventh gates $H_1$, $H_5$ and $H_7$ to their conducive condition, while the component $z_1$ remains unchanged.

The lateral slope chip formation is maintained in essentially the same manner as the maintenance of the plane parallel to the plane of travel PT of the excavator, the difference being only in the third compensating amplifier C halting the pivot motion of the excavator with its output. Prior to the commencement of the excavation operation, the fifth gate $H_5$ is switched to its nonconductive condition and the sixth and seventh gates are switched to their conductive condition. At the instant of balance at the third compensating amplifier C, the following equation applies.

$$C_2 \ldots x'_1 - kz_2 - x_2 \cos \epsilon = o$$

This halts the pivot motion, extends the jib of the excavator by one chip, and maintains the plane parallel to the travel plane PT.

The horizontal plane is maintained, thereby providing the chip by extension of the jib, and the operating cycle, are essentially similar to the maintenance of the plane parallel to the travel plane PT of the excavator. The only difference is that the ninth gate $H_9$ is maintained in its conductive condition and the second compensating amplifier B solves the following equation.

$$B_4 \ldots z_1 + x_2 \tan \delta - z_2 = o$$

Any desired or required plane is maintained, thereby providing the chip by extension of the jib, and the operating cycle, are essentially similar to the maintenance of the plane parallel to the plane of travel PT of the excavator. The only difference is that the eighth gate $H_8$ is maintained in its conductive condition and the second compensating amplifier B solves the following equation.

$$B_3 \ldots z_1 + k_1 x_2 \cos \epsilon + k_2 x_2 \sin \epsilon - z_2 = o$$

Any plane relative to a reference plane is maintained by a combination of maintaining the horizontal plane and maintaining any desired plane. The eighth and ninth gates $H_8$ and $H_9$ are maintained in their conductive condition and the third compensating amplifier B solves the following equation.

$$B_5 \ldots z_1 + x_2 \tan \delta + k_1 x_2 \cos \epsilon + k_2 x_2 \sin \epsilon - z_2 = o$$

Figure 1B:
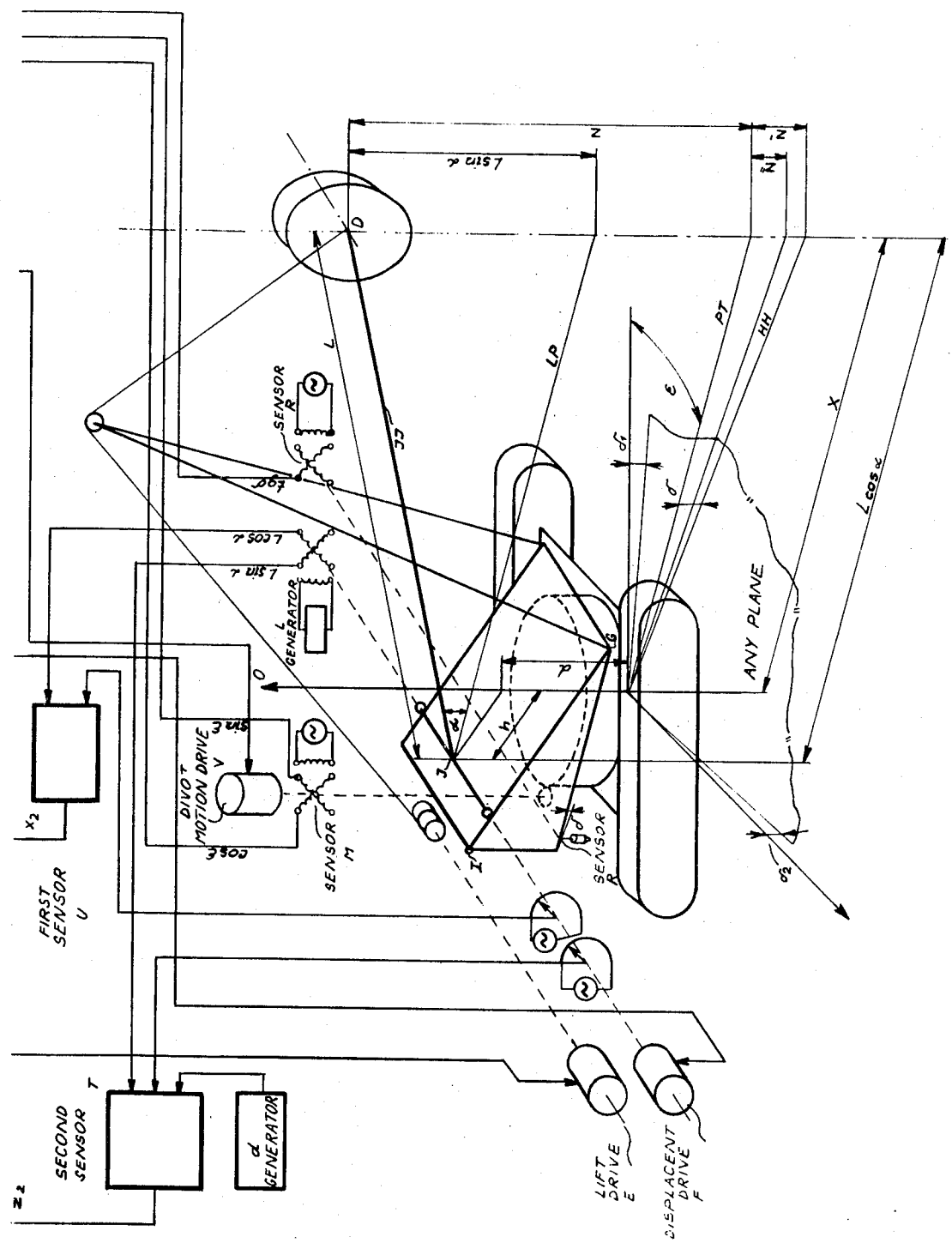
Figure 2:
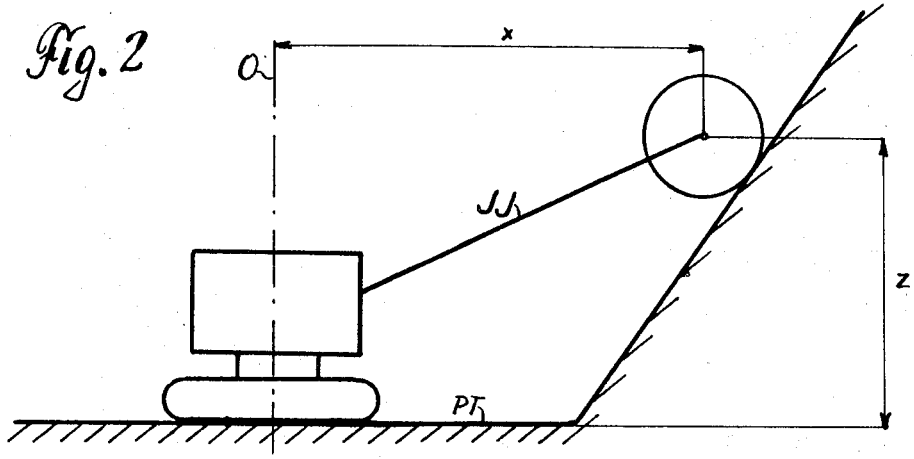
FIG. 2 is a schematic diagram illustrating the maintenance of a frontal slope.
Figure 3:
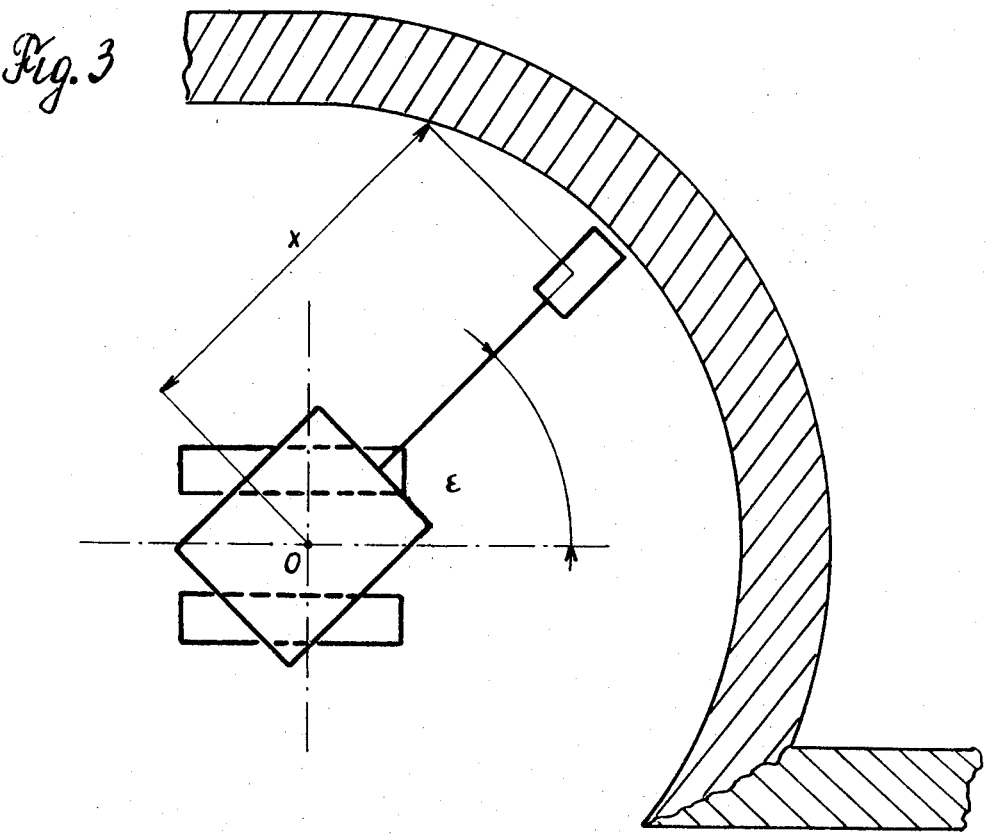
FIG. 3 is a schematic diagram illustrating the control of the pivotal motion.

Each of the gates of the system of FIG. 1 may comprise any suitable known gate means for controlled switching as for example, a conventional relay with a sufficient number of contacts for its intended purpose. Each of the adders as shown in FIG. 1, may comprise any suitable known adder for providing a sum, the one shown in FIG. 1a being symbolic only. The adder functions, as mentioned earlier, to provide individual voltages from sensors and potentiometers connected in series so that all the voltages will be galvanically separated (the potentiometers and sensors being fed from separate windings of the transformer) and so that the particular voltages passing through the respective adder will be connected into series with suitable polarity. Each of the potentiometers of the system of FIG. 1 may comprise any suitable known device for providing selected voltage and the potentiometers $P_1$, $P_2$ and $P_3$ may be selected from conventionally accurate and stable units whose operation may be easily controlled by suitable electric motors. The other potentiometers of the system indicated in FIG. 1a can be any other type of potentiometer such as, closely wound wire potentiometers having slide mechanism. Each compensating amplifier may be also selected from conventional amplifiers for alternating signals and having suitable terminals by which the motors potentiometers $P_1$, $P_2$ and $P_3$ may be fed. The amplifiers should also have a separate terminal suitable for controlling the particular movement responsive to it. The output voltage of the terminal must be dependent as to polarity of the input signal such that the input voltage may be decreased with the operation of the amplifier to the zero value as previously described. The multipliers as described in this system as shown in FIG. 1a each is also conventional being designed for multiplying voltages and provided with sufficient numbers of potentiometers for making the product of such voltages.

A Selsyn is a servomechanism which translates mechanical variables into electrical signals and, by interconnecting wires, can relay such signals to a remote point where they are reconverted to mechanical variables. "Selsyn" is a trademark of the General Electric Company. A Selsyn is described on pages 162 and 163 of a textbook entitled, "Manual of Electromechanical Devices," edited by Douglas C. Greenwood, 1965, McGraw-Hill Book Company.

While the invention has been described by means of a specific example and in a specific embodiment, we do not wish to be limited thereto, for obvious modifications will occur to those skilled in the art without departing from the spirit and scope of the invention.

We claim:

1. An analog control system for automatically controlling the operation of an excavator having a jib and a wheel mounted on the jib and including a normal distance from the axis of said wheel to the pivot axis of said excavator, a normal distance from the axis of said wheel to the plane of travel of said excavator, a jib control for controlling the displacement of said jib and the lift of said jib and including a displacement drive for said jib and a lift drive for said jib, an angular displacement of the projection of the normal distance from the axis of said wheel to said pivot axis to said plane of travel and the pivot motion of said excavator, an angular displacement of said plane of travel from the horizontal plane in the direction of said first mentioned angular displacement, and a pivot motion drive, said analog control system determining the position of the axis of said wheel in a system of coordinates derived from the motion of said excavator, said analog control system comprising a first sensor for sensing a coordinate $x$ representing the normal distance from the axis of said wheel to said pivot axis;

a second sensor for sensing a coordinate $z$ representing the normal distance from the axis of said wheel to said plane of travel;

a third sensor for sensing the angle representing the angular displacement of the projection of the normal distance from the axis of said wheel to said pivot axis to said plane of travel and the pivot motion of said excavator;

a fourth sensor for sensing the angle $\delta$ representing the angular displacement of said plane of travel from the horizontal plane in the direction of the angular displacement $\epsilon$; and control means comprising servomultiplier means, a plurality of compensating amplifiers, a plurality of adders and a plurality of gates connected between said amplifiers and adders for controlling the operation thereof, said control means electrically connected between each of said first, second, third and fourth sensors and each of said displacement drive, said lift drive and said pivot motion drive, each of said displacement, lift and pivot means drives being mechanically coupled to a corresponding one of said sensors.

2. An analog control system as claimed in claim 1, wherein said control means further comprises a plurality of potentiometers connected to and controlled in operation by said gates.

3. An analog control system as claimed in claim 2, wherein said compensating amplifiers comprise a first compensating amplifier connected to said displacement drive via one of said gates, a second compensating amplifier connected to said lift drive via another of said gates, and a third compensating amplifier directly connected to said pivot motion drive.

4. An analog control system as claimed in claim 2, wherein said servomultiplier has a plurality of inputs connected to corresponding ones of the outputs of said third sensor, to the output of the first sensor and to the output of said fourth sensor, said servomultiplier providing the expressions $x\cos \epsilon$, $x_2 \sin \epsilon$ and $x_2 \tan \delta$ when said first sensor senses coordinates $x_2$.

5. An analog control system for automatically controlling the operation of an excavator having a jib and a wheel mounted on the jib and including a normal distance from the axis of said wheel to the pivot axis of said excavator, a normal distance from the axis of said wheel to the plane of travel of said excavator, a jib control for controlling the displacement of said jib and the lift of said jib and including a displacement drive for said jib, a lift drive for said jib, an angular displacement of the projection of the normal distance from the axis of said wheel to said pivot axis to said plane of travel and the pivot motion of said excavator, an angular displacement of said plane of travel from the horizontal plane in the direction of said first mentioned angular displacement, and a pivot motion drive, said analog control system determining the position of the axis of said wheel in a system of coordinates derived from the motion of said excavator, said analog control system comprising
- a first sensor having an output for sensing a coordinate $x$ representing the normal distance from the axis of said wheel to pivot axis;
- a servomultiplier having a plurality of outputs and inputs including an input connected to the output of said first sensor;
- a first adder;
- a first compensating amplifier having outputs and an input connected to the output of said first sensor via said first adder;
- a second sensor having an output for sensing a coordinate $z$ representing the normal distance from the axis of said wheel to said plane of travel;
- a third adder;
- a second compensating amplifier having an output and an input connected to the output of said second sensor via said third adder;
- a second gate connected between the output of said first compensating amplifier and said displacement drive;
- mechanical coupling means coupling said displacement drive to said first sensor;
- a fourth gate connected between the output of said second compensating amplifier and said lift drive;
- mechanical coupling means coupling said lift drive to said second sensor;
- a third sensor having outputs for sensing an angle $\epsilon$ representing the angular displacement of the projection of the normal distance from the axis of said wheel to said pivot axis to said plane of travel and the pivot motion of said excavator;
- a fourth sensor having an output for sensing an angle $\delta$ representing the angular displacement of said plane of travel from the horizontal plane in the direction of the angular displacement $\epsilon$, an output of said third sensor being connected to said fourth sensor, a second output of said third sensor being connected to a corresponding input of said servomultiplier, a third output of said third sensor being connected to a corresponding input of said servomultiplier and the output of said fourth sensor being connected to a corresponding input of said servomultiplier;
- an eighth adder;
- a sixth potentiometer connected between an output of said servomultiplier and said eighth adder;
- a sixth adder directly connected to said output of said servomultiplier;
- a seventh potentiometer connected between another output of said servomultiplier and said eight adder;
- a seventh adder directly connected to said third adder;
- an eighth gate connected between said eighth adder and said seventh adder;
- a ninth gate connected between another output of said servomultiplier and said seventh adder;
- a fourth adder directly connected to said third adder;
- a second potentiometer;
- a third gate connected in series with said second potentiometer between said second compensating amplifier and said fourth adder;
- a fifth potentiometer;
- a tenth gate connected between said fourth adder and said fifth potentiometer;
- a second adder directly connected to said first adder;
- an eighth potentiometer directly connected at one end to each of said sixth and second adders and directly connected at its other end to each of said third and fourth adders;
- a fourth potentiometer;
- an eleventh gate connected between said second adder and said fourth potentiometer;
- a first potentiometer;
- a fist gate connected between an output of said first compensating amplifier and said first potentiometer;
- a fifth adder;
- a sixth gate connected between said fifth and sixth adders;
- a seventh gate connected between said first potentiometer and said fifth adder;
- a third compensating amplifier having outputs and an input directly connected to said fifth adder;
- a third potentiometer and a fifth gate connected in series between said third compensating amplifier and said fifth adder, said pivot motion drive being directly connected to an output of said third compensating amplifier; and
- mechanical coupling mans coupling said pivot motion drive to said third sensor.

* * * * *